(12) United States Patent
Arai

(10) Patent No.: US 8,985,548 B2
(45) Date of Patent: Mar. 24, 2015

(54) COMPOSITE VALVE

(71) Applicant: Fujikoki Corporation, Tokyo (JP)

(72) Inventor: Yusuke Arai, Tokyo (JP)

(73) Assignee: Fujikoki Corporation, Tokyo (JP)

( * ) Notice: Subject to any disclaimer, the term of this patent is extended or adjusted under 35 U.S.C. 154(b) by 313 days.

(21) Appl. No.: 13/711,828

(22) Filed: Dec. 12, 2012

(65) Prior Publication Data

US 2013/0167949 A1 Jul. 4, 2013

(30) Foreign Application Priority Data

Dec. 15, 2011 (JP) .................................. 2011-273973

(51) Int. Cl.
| | |
|---|---|
| *F16K 31/04* | (2006.01) |
| *F16K 31/40* | (2006.01) |
| *F16K 31/363* | (2006.01) |
| *F25B 41/06* | (2006.01) |

(52) U.S. Cl.
CPC ............... *F16K 31/04* (2013.01); *F16K 31/406* (2013.01); *F16K 31/363* (2013.01); *F25B 41/062* (2013.01); *F25B 2341/065* (2013.01); *F25B 2341/0671* (2013.01); *Y02B 30/72* (2013.01)
USPC ........................... 251/25; 137/487.5; 137/489

(58) Field of Classification Search
CPC ..... F16K 31/40; F16K 31/406; F16K 31/363; F16K 31/04; F25B 2341/0671; F25B 2341/06; F25B 41/062; F25B 2341/0651; Y02B 30/72
USPC .................. 251/25, 30.01–30.05, 33, 36, 41; 137/489, 491, 492.5
See application file for complete search history.

(56) References Cited

U.S. PATENT DOCUMENTS

| | | | | |
|---|---|---|---|---|
| 2,317,639 A | * | 4/1943 | Ray ............................ | 251/30.05 |
| 4,172,466 A | * | 10/1979 | Pattarini et al. ............... | 137/488 |
| 4,201,362 A | | 5/1980 | Nishimi et al. | |
| 4,300,586 A | * | 11/1981 | Thuries et al. ................ | 137/110 |
| 4,615,354 A | * | 10/1986 | Bianchi ......................... | 137/110 |
| 5,417,402 A | * | 5/1995 | Speybroeck ............... | 251/30.01 |
| 2004/0036044 A1 | * | 2/2004 | Hirota ......................... | 251/30.02 |
| 2004/0200530 A1 | * | 10/2004 | Dalton et al. ................. | 137/489 |

FOREIGN PATENT DOCUMENTS

EP 2 503 202 A1 9/2012

OTHER PUBLICATIONS

Search Report dated Feb. 17, 2014 issued in corresponding European application No. 12 195189.1.

* cited by examiner

*Primary Examiner* — William McCalister
*Assistant Examiner* — Michael R Reid
(74) *Attorney, Agent, or Firm* — Bacon & Thomas, PLLC

(57) ABSTRACT

A composite valve has a communication path communicating a first valve chamber with a second valve chamber, a second valve port communicating the second valve chamber with an outflow port, and a pilot passage communicating a back pressure chamber with the outflow port. In the case that a lift amount of a second valve body for a small flow rate control is equal to or less than a predetermined amount, the pilot passage is closed by a pilot valve body, and a first valve port is closed by a first valve body, thereby taking a small flow rate control state. In the case that the lift amount of the second valve body goes beyond the predetermined amount, the pilot valve body is moved up in conjunction with the upward movement of a valve shaft so as to open the pilot passage, thereby taking a large flow rate control state.

6 Claims, 8 Drawing Sheets

COMPOSITE VALVE

BACKGROUND OF THE INVENTION

1. Field of the Invention

The present invention relates to a composite valve which is preferably used in a heat pump type cooling and heating system or the like, and more particularly to a composite valve which is provided with a pilot type large flow rate control valve and a small flow rate control valve.

2. Description of the Conventional Art

As a heat pump type cooling and heating system, there has been conventionally known a structure which is provided with a compressor, a condenser, an evaporator, an expansion valve and a four-way valve for converting (inverting) a refrigerant flow path.

On the other hand, as a heat pump type cooling and heating system for a vehicle (for example, for an electric vehicle), there has been proposed a system which does not invert a flow of a refrigerant and is provided independently with an expansion valve for cooling and an expansion valve for heating, for example, as shown in FIG. 1 of Japanese Patent No. 3799732.

The flow of the refrigerant is not inverted in the system mentioned above. Accordingly, for example, paying attention to an expansion valve for heating (reference numeral 24) shown in FIG. 1 of Japanese Patent No. 3799732, it is structured such that an electromagnetic valve for cooling (reference numeral 26) is provided in parallel with the expansion valve for heating, the electromagnetic valve for cooling is closed and the refrigerant is narrowed down by means of the expansion valve for heating at a time of heating, and the expansion valve does not carry out the narrowing down of the refrigerant by setting the electromagnetic valve for cooling open and bypassing the inlet and outlet of the expansion valve for heating at a time of cooling.

In the meantime, if the expansion valve and the electromagnetic valve for bypassing are respectively provided for cooling and for heating, the system is enlarged in size, a piping assembling cost or the like becomes high, and there is a risk that an electric power consumption is enlarged.

Accordingly, it is thought to achieve these functions by one electrically operated valve. In other words, for example, the refrigerant may be narrowed down by the electrically operated valve at a time of heating, and the electrically operated valve may be fully opened at a time of cooling.

In this case, a description will be given of one example of a conventional electrically operated valve with reference to FIG. 8.

An electrically operated valve 1' in an illustrated example is provided with a valve shaft 25 which has a lower shaft portion 25a and an upper small diameter shaft portion 25b, a valve main body 40 which has a valve chamber 41, a can 60 which is bonded in a sealing manner to the valve main body 40 in its lower end portion, a rotor 30 (a rotating axis O) which is arranged in an inner periphery of the can 60 so as to be spaced at a predetermined gap a, and a stator 50A which is outward fitted to the can 60 so as to rotationally drive the rotor 30.

The valve shaft 25 is integrally provided with a valve body portion 44 having a specific shape (two stages of inverted circular truncated cone shapes respectively having predetermined angles of center) in a lower end portion of the lower shaft portion 25a, and the present electrically operated valve 1' is structured such that a passing flow rate of the refrigerant is controlled by changing a lift amount of the valve body portion 44.

The valve chamber 41 of the valve main body 40 is provided in its lower portion with a valve seat 42 having a valve port (an orifice) 43 which the valve body portion 44 comes close to and away from, and is opened in its side portion to a first inlet and outlet 5', and a lower portion of the valve main body 40 is provided with a second inlet and outlet 6' so as to be connected to the valve port 43.

The stator 50A is constructed by a yoke 51, a bobbin 52, a stator coil 53, a resin mold cover 56 and the like, a stepping motor 50 is constructed by the rotor 30, the stator 50A and the like, and an elevation driving mechanism for regulating a lift amount (=an opening degree) of the valve body portion 44 with respect to the valve port 43 is constructed by the stepping motor 50, a feed screw (a female thread portion 38 and a male thread portion 48) mentioned below and the like.

A support ring 36 is integrally connected to the rotor 30, and an upper protruding portion of a lower opened and tubular valve shaft holder 32 which is arranged in an outer periphery of a guide bush 46 is fixed, for example, by caulking to the support ring 36, whereby the rotor 30, the support ring 36 and the valve shaft holder 32 are integrally connected.

Further, a lower end portion of the tubular guide bush 46 is pressed into and fixed to a fitting hole 49 which is provided in an upper portion of the valve main body 40, and the lower shaft portion 25a of the valve shaft 25 is inward inserted slidably to the guide bush 46. Further, in order to move up and down the valve shaft 25 (the valve body portion 44) by utilizing a rotation of the rotor 30, a male thread portion 48 is formed in an outer periphery of the guide bush 46, a female thread portion 38 is formed in an inner periphery of the valve shaft holder 32, and a feed screw is constructed by the male thread portion 48 and the female thread portion 38.

Further, an upper small diameter portion 46b of the guide bush 46 is inward inserted to an upper portion of the valve shaft holder 32, and the upper small diameter shaft portion 25b of the valve shaft 25 is inserted to (a through hole formed in) the center of a ceiling portion of the valve shaft holder 32. A push nut 33 is pressed into and fixed to an upper end portion of the upper small diameter shaft portion 25b of the valve shaft 25.

Further, the valve shaft 25 is outward inserted to the upper small diameter shaft portion 25b of the valve shaft 25, and is normally energized downward (in a valve closing direction) by a valve closing spring 34 constructed by a compression coil spring which is installed in a compression manner between a ceiling portion of the valve shaft holder 32 and an upper end terrace surface of the lower shaft portion 25a in the valve shaft 25. A restoring spring 35 constructed by a coil spring is provided in an outer periphery of the push nut 33 on the ceiling portion of the valve shaft holder 32.

To the guide bush 46, there is firmly fixed a lower stopper body (a fixing stopper) 47 which constructs one of rotation and downward movement stopper mechanisms for inhibiting a further rotation and downward movement at a time when the rotor 30 is rotated and moved downward to a predetermined valve closing position, and to the valve shaft holder 32, there is firmly fixed an upper stopper body (a movable stopper) 37 which constructs another of the stopper mechanisms.

In this case, the valve closing spring 34 is arranged for obtaining a desired seal pressure in a valve closed state in which the valve body portion 44 seats on the valve port 43 (preventing a leakage), and for reducing an impact at a time when the valve body portion 44 comes into contact with the valve port 43.

In the electrically operated valve 1' structured as mentioned above, the rotor 30 and the valve shaft holder 32 are rotated in one direction with respect to the guide bush 46 which is fixed to the valve main body 40, by supplying an electrifying and exciting pulse to the motor 50 (the stator 50A) in accordance with a first mode, and on the basis of a screw feeding of the thread portions 48 and 38, for example, the valve shaft holder 32 moves downward, the valve body portion 44 is pressed to the valve seat 42, and the valve port 43 is closed.

At a time point when the valve port 43 is closed, the upper stopper body 37 has not come into contact with the lower stopper body 47 yet, and the rotor 30 and the valve shaft holder 32 further rotate and move downward while the valve body portion 44 closes the valve port 43. In this case, since the valve shaft 25 (the valve body portion 44) does not move downward, however, the valve shaft holder 32 moves downward, the valve closing spring 34 is compressed at a predetermined amount. As a result, the valve body portion 44 is strongly pressed to the valve seat 43, the upper stopper body 37 comes into contact with the lower stopper body 47 on the basis of the rotation and the downward movement of the valve shaft holder 32, and the rotation and the downward movement of the valve shaft holder 32 are forcibly stopped even if the pulse supply with respect to the stator 50A is thereafter carried on.

On the other hand, if the electrifying and exciting pulse is supplied in accordance with a second mode to the stator 50A from this fully closed state, the rotor 30 and the valve shaft holder 32 are rotated in a reverse direction with respect to the guide bush 46 which is fixed to the valve main body 40, and the valve shaft holder 32 moves upward this time on the basis of the screw feeding of the thread portions 48 and 38. In this case, since the valve closing spring 34 is compressed at the predetermined amount as mentioned above, at a time point of starting the rotation and the upward movement of the valve shaft holder 32 (a time point of starting the pulse supply), the valve body portion 44 is not disconnected from the valve seat 42 and remains in the valve closed state (a lift amount=0) until the valve closing spring 34 extends at the predetermined amount mentioned above. Further, if the valve shaft holder 32 is further rotated and moved upward after the valve closing spring 34 extends at the predetermined amount, the valve body portion 24 is disconnected from the valve seat 42 and the valve port 43 is opened, so that the refrigerant passes through the valve port 43.

In this case, it is possible to optionally and finely regulate the lift amount of the valve body portion 44, in other words, an effective opening area (=an opening degree) of the valve port 43 on the basis of an amount of rotation of the rotor 30. Further, since the amount of rotation of the rotor 30 is controlled by a supply pulse number, it is possible to control a flow rate of the refrigerant at a high precision.

Accordingly, in the case that the electrically operated valve 1' having the structure mentioned above is employed as the electrically operated valve having both functions of the expansion valve and the electromagnetic valve for bypassing shown in the Japanese Patent No. 3799732, it is set to a maximum opening degree (a maximum lift amount) in such a manner as to reduce the pressure loss as much as possible so as to serve as the electromagnetic valve for bypassing, for example, at a time of the cooling operation, and it is set such as to finely control the opening degree (the lift amount) so as to serve as the expansion valve and finely control the valve opening degree, that is, the flow rate of the refrigerant, for example, at a time of the heating operation.

However, in the electrically operated valve 1', an improvement of a flow rate control precision in the small flow rate region and an increase of a controllable flow rate come to an antinomy. In other words, in order to make the electrically operated valve 1' serve as the expansion valve, it is necessary to secure a high flow rate control precision in the small flow rate region. Since it is demanded to make a resolving power of the flow rate control high for this purpose, it is necessary to make a valve bore diameter (an effective opening area) as small as possible. On the contrary, in order to make it serve as the electromagnetic valve for bypassing, since it is demanded to suppress the pressure loss as low as possible, the valve bore diameter can not be made so small (smaller than an effective passage cross sectional area of a piping system). In other words, if the valve bore diameter is made smaller, it is possible to make the flow rate control precision in the small flow rate region high, however, if it is intended to increase a flow rate (a controllable flow rate) of the refrigerant which is circulated to the system, the valve port portion comes to a resistance and the pressure loss is enlarged even if the valve opening degree is made maximum. On the contrary, if the valve bore diameter is enlarged, the increase of the controllable flow rate (the reduction of the pressure loss) can be achieved, however, the flow rate control precision in the small flow rate region is lowered. In addition, it is necessary to enlarge the valve body or the like in correspondence to the valve bore diameter, a great torque is necessary for driving the valve body, and there is a risk that an enlargement in size and an increase of an electric power consumption are caused.

Further, if the resolving power is made higher in order to achieve an improvement of the flow rate control precision in the small flow rate region (for example, the valve body lift amount per one rotation of the rotor is made smaller), it takes a long time to reach a full open state (a flow path bypass state) from the small flow rate control state, and an opening gap (a gap between the valve body portion and the valve port wall surface) at a time of the small flow rate control becomes very narrow, so that there is a risk that a foreign material or the like is bitten into the gap so as to be clogged.

Accordingly, in order to achieve both an improvement of a flow rate control precision and an increase of a controllable flow rate (a reduction of the pressure loss) in the small flow rate region, achieve a reduction of a time required for reaching the full open state from the small flow rate control state and achieve a reduction of an electric power consumption, Japanese Patent No. 4416528 discloses a provision of a pilot type first control valve (a first valve body and a first valve port) for a large flow rate and a second control valve (a second valve body and a second valve port) for a small flow rate, in more detail, a composite valve structured such as to open and close the first valve port having a large bore diameter by the piston type first valve body, open and close the second valve port having a small bore diameter by the needle type second valve body which is an independent body from the first valve body and is provided in the lower portion of the valve shaft (25), and make the second control valve for the small flow rate serve as the pilot valve of the first control valve for the large flow rate.

In this composite valve, when the lift amount of the valve shaft (the second valve body) is equal to or less than a predetermined amount (when the second control valve opening degree is equal to or less than a predetermined value), there is established a small flow rate control state in which the first valve body closes the first valve port, and the second control valve opening degree for the small flow rate is controlled by the second valve body. At this time, the refrigerant at an amount corresponding to the lift amount (the second control valve opening degree) of the second valve body flows to the inflow port→the first valve chamber→the gap of the sliding surface formed between the outer peripheral surface of the first valve body and the wall surface of the fitting and inserting chamber→the back pressure chamber→the pilot passage→the second valve chamber→the second valve port→the outflow passage→the outflow port. Further, if the lift amount of the valve shaft (the second valve body) goes beyond the predetermined amount, the amount of the refrigerant flowing out of the back pressure chamber via the second valve port is increased in comparison with the small flow rate control time, the pressure of the back pressure chamber is lowered, and the valve opening force becomes finally larger than the valve closing force acting on the first valve body, whereby the first valve body opens the first valve port, and there is established a large flow rate control state in which the refrigerant flows to the inflow port→the first valve chamber→the first valve port→the outflow port.

As mentioned above, it is possible to achieve both the improvement of the flow rate control precision in the small flow rate region and the increase of the controllable flow rate (the reduction of the pressure loss), and the low electric power consumption, by opening and closing the first valve port having the large bore diameter by means of the first valve body, opening and closing the second valve port having the small bore diameter by means of the second valve body, and making the second valve body serve as the pilot valve of the first control valve for the large flow rate.

However, in the composite valve described in the Japanese Patent No. 4416528, since the single second control valve for the small flow rate serves as the control valve for the small flow rate region and the pilot valve with respect to the first control valve for the large flow rate, there is a risk that the following problem is generated. In other words, since it is necessary to widely increase the flow rate of the refrigerant passing through the second control valve for the small flow rate in comparison with the small flow rate control time, in order to switch from the small flow rate control to the large flow rate control, it is necessary to set the bore diameter (the effective opening area) of the second valve port significantly larger than the bore diameter which is necessary for the small flow rate control. Accordingly, an increase of a motion load, and an enlargement in size of a driving portion (a motor portion) and a valve main body tend to be caused, and a dimensional and a shape of the second control valve for the small flow rate can not be set to those which are optimum for the small flow rate control, so that there is such a problem that a flow rate control precision at a time of the small flow rate control can not be enhanced very much.

Further, since the opening and closing of the first control valve for the large flow rate depends on the lift amount of the second valve body changing subtly, there is not a little a case that the opening and closing of the first control valve for the large flow rate is not carried out at a desired timing. Further, since the refrigerant is circulated via the sliding surface gap of the first valve body→the back pressure chamber→the pilot passage at a time of the small flow rate control, there is such a problem that a malfunction caused by a small foreign material mixed into the refrigerant (for example, the locking of the first valve body caused by the biting of the small foreign material into the sliding surface gap) tends to be generated.

Accordingly, in order to overcome the above mentioned problem, the inventors of the present application has previously proposed the composite valve as described in Japanese Patent Application No. 2011-68451 filed on March 25 (corresponding to U.S. patent application Ser. No. 13/423,490 filed on Mar. 19, 2012, claiming priority of the Japanese Patent Application No. 2011-68451). The composite valve is provided with a piston type first valve body, a valve shaft provided with a needle type second valve body, an elevation driving means for moving up and down the valve shaft, a pilot valve body driven so as to be opened and closed by utilizing the elevating motion of the valve shaft, and a valve main body provided with an inflow port and an outflow port, and is structured such that between the inflow port and the outflow port in the valve main body, there are provided a fitting and inserting chamber to which the first valve body is slidably fitted and inserted, and which is zoned into a back pressure chamber and a first valve chamber by the first valve body, a first valve port which is open to the first valve chamber, a second valve chamber in which the pilot valve body and the second valve body are arranged so as to be movable up and down, a second valve port which communicates the inflow port or the first valve chamber with the second valve chamber, and a pilot passage which communicates the back pressure chamber with the second valve chamber, and such that in the case that a lift amount of the second valve body is equal to or less than a predetermined amount, the pilot passage is closed by the pilot valve body, and the first valve port is closed by the first valve body, thereby taking a small flow rate control state in which a flow rate is controlled in correspondence to the lift amount of the second valve body, and in the case that the lift amount of the second valve body goes beyond the predetermined amount, the pilot valve body is moved up in conjunction with the upward movement of the valve shaft so as to open the pilot passage, thereby taking a large flow rate control state in which the first valve body opens the first valve port on the basis of this. In this composite valve, an actuator for moving up and down the valve shaft 25 as described with regard to FIG. 8 can be used as an elevating means of the valve shaft which is provided with the second valve body.

In the proposed composite valve mentioned above, the second valve body for the small flow rate control is provided independently from the pilot valve body for driving the first valve body for the large flow rate control, the second valve body carries out the small flow rate control until the second valve body lifts up at a predetermined amount, and the pilot valve body is drawn up at a state that the second valve body lifts up at the predetermined amount so as to drive the first valve body. Accordingly, it is possible to set the dimension and the shape of the second control valve for the small flow rate (the second valve body) so as to be optimum for the small flow rate control, and it is possible to securely carry out the opening and closing of the first control valve for the large flow rate (the first valve body) at a desired timing. Further, there can be achieved such an excellent effect that it is possible to make the malfunction hard to be generated.

SUMMARY OF THE INVENTION

However, in the composite valve described in Japanese Patent Application No. 2011-68451 mentioned above, there has been the following problem to be improved. In other words, since a high pressure from the first valve chamber is applied to the second valve body in the valve closed state in a direction of opening the valve through the second valve port (a pushing up direction), it is necessary to use a valve closing spring having a significantly large spring load as a valve closing spring (reference numeral 34 in FIG. 8) which energizes the second valve body (the valve shaft) in the valve closing direction in order to prevent the second valve body from undesirably opening the valve (maintain the second control valve for the small flow rate in the valve closed state), and the bore diameter of the second valve port is constrained.

If the valve closing spring having the large spring load is used, it is necessary to use an electrically operated motor which generates the corresponding driving torque, in order to lift up the second valve body against the energizing force of the valve closing spring, thereby causing a cost increase, an enlargement in size of a whole valve, an increase of an electric power consumption and the like. Further, if the bore diameter of the second valve port is constrained as mentioned above, it becomes hard to achieve both the improvement of the flow rate control precision in the small flow rate region and the improvement of the controllable flow rate (the reduction of the pressure loss).

The present invention is made by taking the actual condition mentioned above into consideration, and an object of the present invention is to provide a composite valve which is provided with a pilot type first control valve for a larger flow rate and a second control valve for a small flow rate, for achieving both an improvement of a flow rate control precision in a small flow rate region and an increase of a controllable flow rate (a reduction of a pressure loss), can set a dimension and a shape of the second control valve for the small flow rate to those which are optimum for a small flow rate control, can securely prevent a second valve body from being undesirably opened, and can achieve a cost reduction, a downsizing, a reduction of an electric power consumption and the like.

In order to achieve the object mentioned above, a composite valve in accordance with the present invention is basically comprising:

a first valve body;

a valve shaft which is provided with a second valve body;

an elevation driving means for moving up and down the valve shaft;

a pilot valve body which is driven so as to be opened and closed by utilizing an elevating motion of the valve shaft; and a valve main body which is provided with an inflow port and an outflow port, wherein between the inflow port and the outflow port in the valve main body, there are provided a fitting and inserting chamber to which the first valve body is slidably fitted and inserted, and which is zoned into a back pressure chamber and a first valve chamber by the first valve body, a first valve port which is open to the first valve chamber, a second valve chamber in which the pilot valve body and the second valve body are arranged so as to be movable up and down, a communication path which communicates the inflow port or the first valve chamber with the second valve chamber, a second valve port which communicates the second valve chamber with the outflow port, and a pilot passage which communicates the back pressure chamber with the outflow port, and wherein in the case that a lift amount of the second valve body is equal to or less than a predetermined amount, the pilot passage is closed by the pilot valve body, and the first valve port is closed by the first valve body, thereby taking a small flow rate control state in which a flow rate is controlled in correspondence to the lift amount of the second valve body, and in the case that the lift amount of the second valve body goes beyond the predetermined amount, the pilot valve body is moved up in conjunction with the upward movement of the valve shaft so as to open the pilot passage, thereby taking a large flow rate control state in which the first valve body opens the first valve port on the basis of this.

In accordance with a preferable aspect, the first valve body and the second valve body are arranged in such a manner that their center lines are orthogonal to each other.

In accordance with the other preferable aspect, the inflow port, the outflow port and the fitting and inserting chamber are provided transversely in the valve main body, and the second valve chamber is provided vertically.

In accordance with the other preferable aspect, the communication path and the second valve port are constructed as linear vertical holes in which their upper ends are open to a bottom surface of the second valve chamber.

In accordance with the other preferable aspect, the pilot valve is energized downward by a spring member so as to close the pilot passage, and is pulled up against the energizing force of the spring member by a catch portion which is provided in the valve shaft, if the lift amount of the second valve body is increased further more than the predetermined amount.

In accordance with the other preferable aspect, the first valve body is provided with a pressure equalizing hole which communicates the first valve chamber with the back pressure chamber.

Since the composite valve in accordance with the present invention is provided with the pilot valve body which is independent from the second valve body, in addition to the first control valve for the large flow rate (the first valve body and the first valve port), and the second control valve for the small flow rate (the second valve body and the second valve port), and is structured such as to drive the pilot valve body so as to open and close by utilizing the elevating motion of the valve shaft which is provided with the second valve body, it is possible to set the dimension and the shape of the second control valve for the small flow rate (the second valve body and the second valve port) so as to be optimum for the small flow rate control, and it is possible to securely carry out the opening and closing of the first control valve for the large flow rate at a desired timing. Further, since the structure is made such as to circulate the refrigerant without passing through the narrow portion such as the sliding surface gap or the like as is different from the conventional one, at a time of controlling the small flow rate, it is possible to make the malfunction hard to be generated. As a result, it is possible to achieve both an improvement of the flow rate control precision in the small flow rate region, and an increase of the controllable flow rate (a reduction of the pressure loss), without causing an increase of a motion load, and an enlargement in size of the driving portion (the motor portion) and the valve main body.

In addition, in the composite valve in accordance with the present invention, since the second valve port which is opened and closed by the second valve body is communicated with the outflow port, and the composite valve is provided with the communication path which communicates the inflow port or the first valve chamber with the second valve chamber, and is structured such that the high pressure in the first valve chamber is introduced into the second valve chamber, a valve closing force (a pushing down force) acting on the second valve body in the valve closing state becomes significantly larger than a force which is going to push up it. Therefore, it is possible to securely prevent the second valve body from opening the valve undesirably without enlarging the spring load of the valve closing spring which energizes the second valve body (the valve shaft) in the valve closing direction, and it is possible to reduce the constraint with respect to the bore diameter of the second valve port or the like. As a result, it is possible to achieve a cost reduction, a downsizing and a reduction of an electric power consumption.

Further, since the first valve body 15 and the second valve body 24 are arranged in such a manner that the center lines are orthogonal to each other, the inflow port, the outflow port and the fitting and inserting chamber are provided transversely, the second valve chamber 21 is provided vertically, and the vertical hole communication path and the second valve port are constructed by the linear vertical hole in which the upper ends thereof are open to the bottom surface of the second valve chamber, the refrigerant flow path is shortened in comparison with the case that they are all arranged vertically.

Accordingly, it is possible to achieve a downsizing, a further reduction of the pressure loss, a reduction of a working cost and the like.

Further, in the composite valve in accordance with the present invention, since the pilot valve body is arranged in the second valve chamber to which the high pressure of the first valve chamber is introduced, the high pressure is applied to the other portions than a pilot valve seat occluded portion in the pilot valve body. Accordingly, it is possible to securely prevent the pilot valve body from opening the valve undesirably without enlarging the spring load of the spring which energizes the pilot valve body in the direction of closing the pilot passage. As a result, it is possible to reduce the constraint with respect to an inner diameter of the pilot passage 19 and a bore diameter of the pilot valve seat, so that it is possible to achieve a cost reduction, a downsizing, a reduction of the electric power consumption and the like

DETAILED DESCRIPTION OF PREFERRED EMBODIMENT

A description will be given below of an embodiment in accordance with the present invention with reference to the accompanying drawings.

Figure 1:
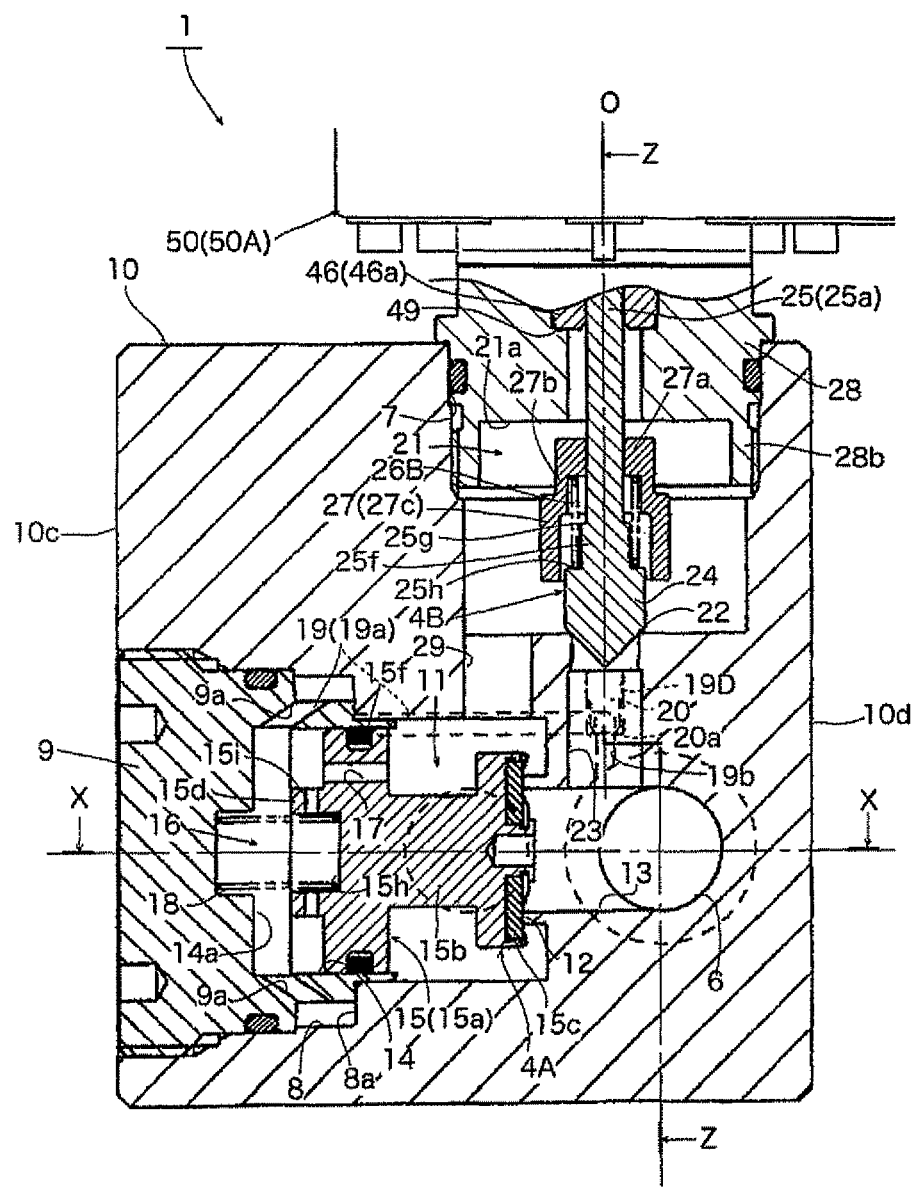
FIG. 1 is an enlarged cross sectional view of a substantial part and shows an embodiment of a composite valve in accordance with the present invention.
Figure 2:
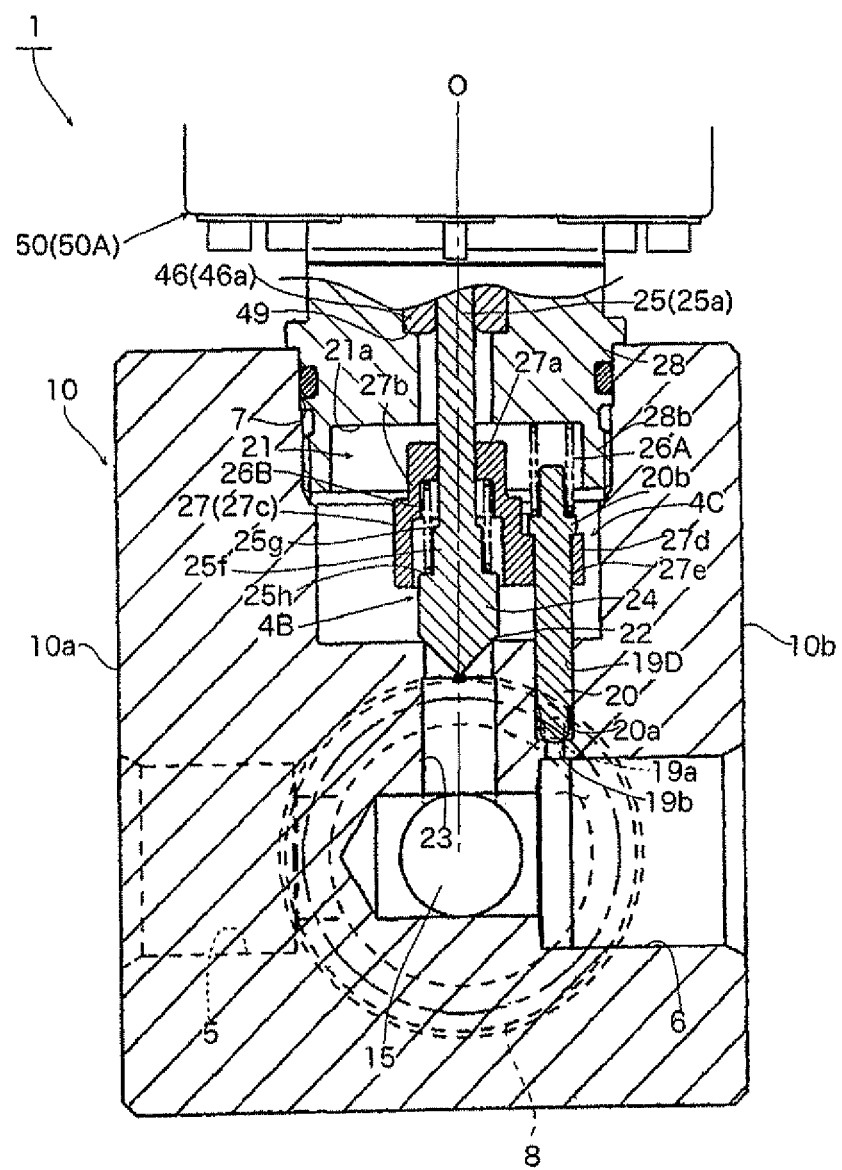
FIG. 2 is a cross sectional view as seen from an arrow Z-Z in FIG. 1, and shows a first motion state (a fully closed state)
Figure 3:
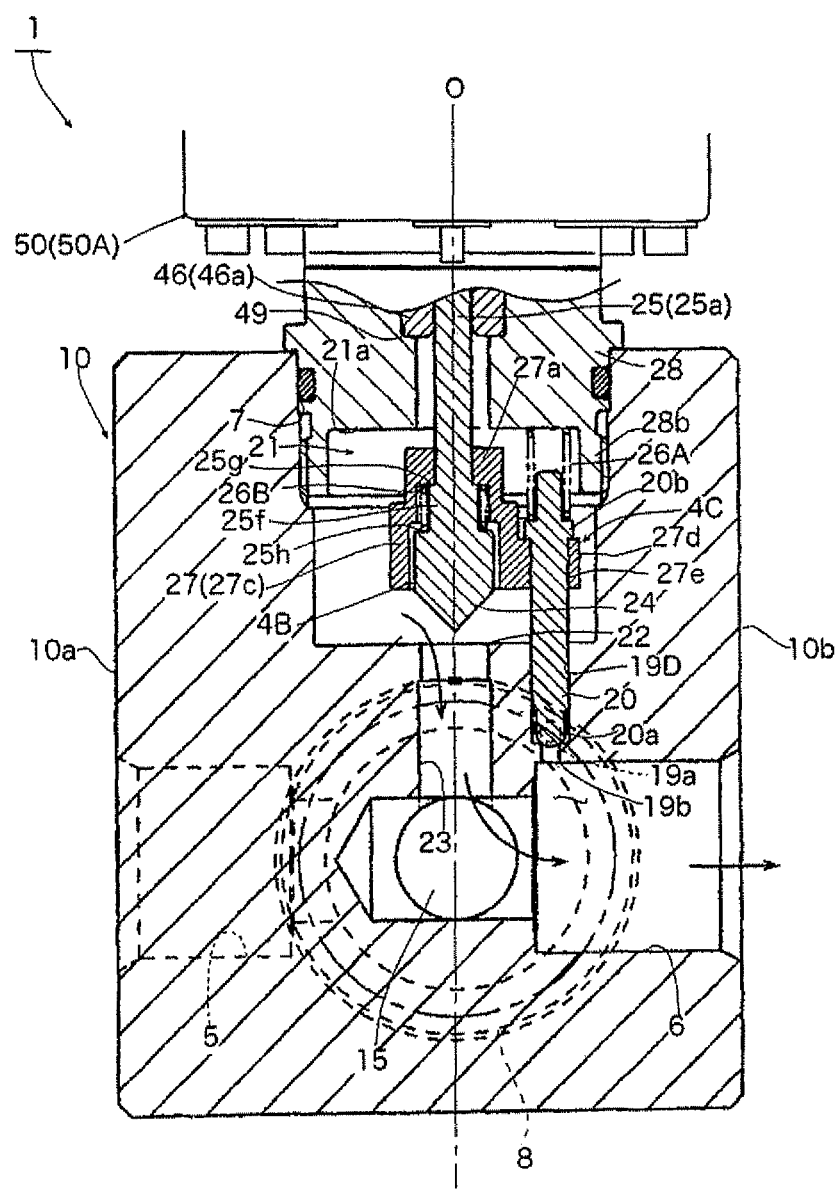
FIG. 3 is a cross sectional view as seen from the arrow Z-Z in FIG. 1, and shows a second motion state (a small flow rate control state)
Figure 4:
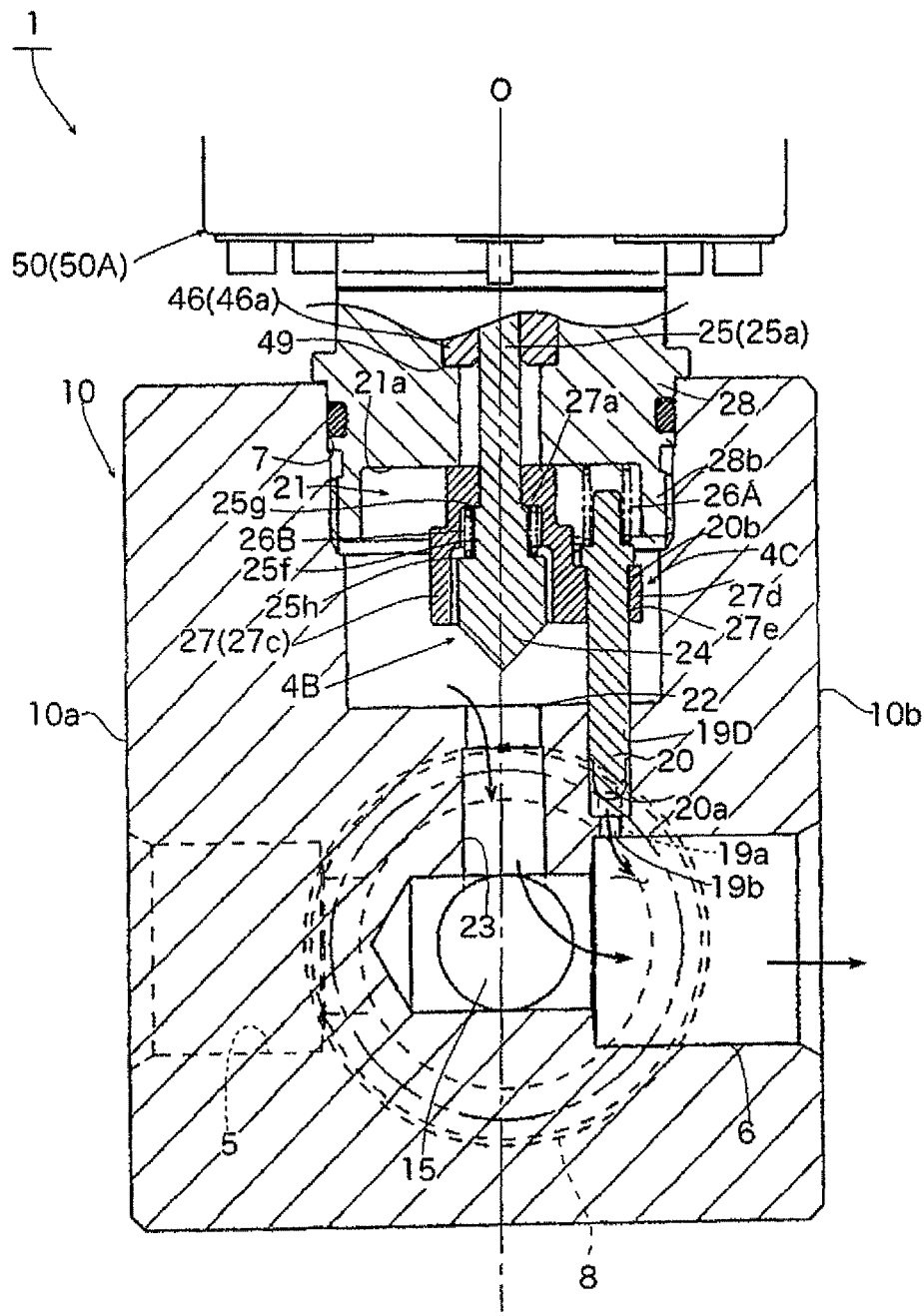
FIG. 4 is a cross sectional view as seen from the arrow Z-Z in FIG. 1, and shows a third motion state (a large flow rate control state)
Figure 5:
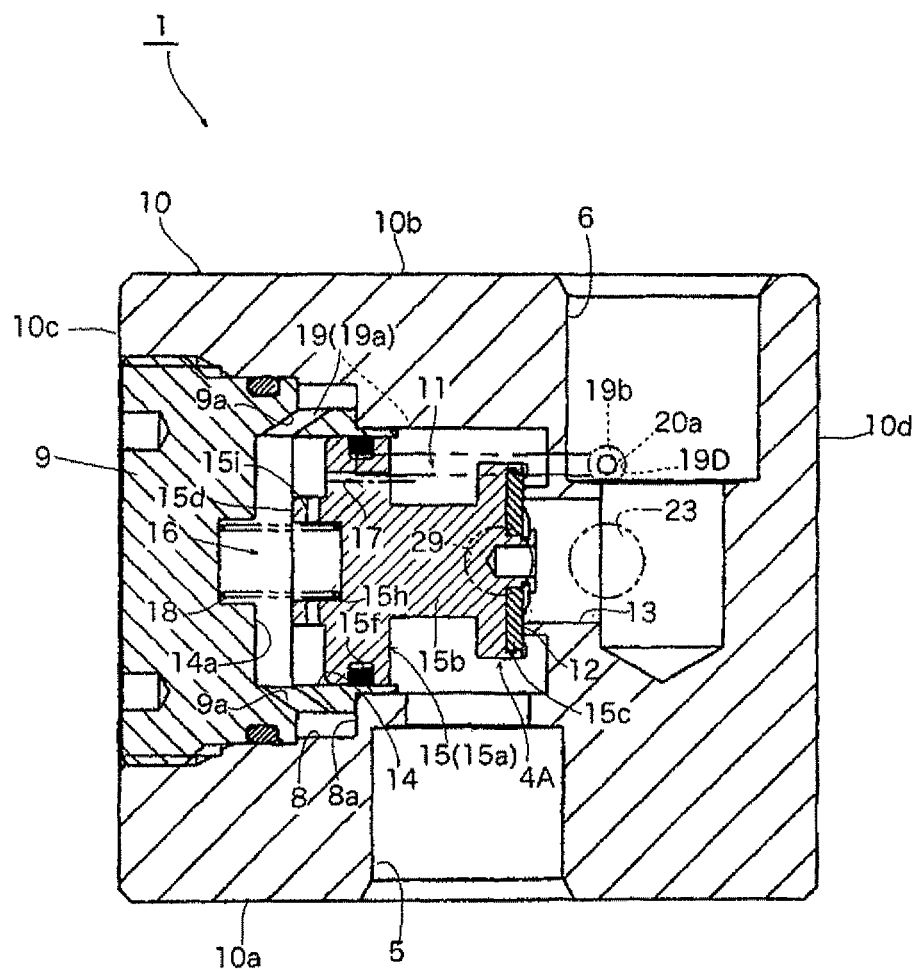
FIG. 5 is a cross sectional view as seen from an arrow X-X in FIG. 1.
Figure 6:
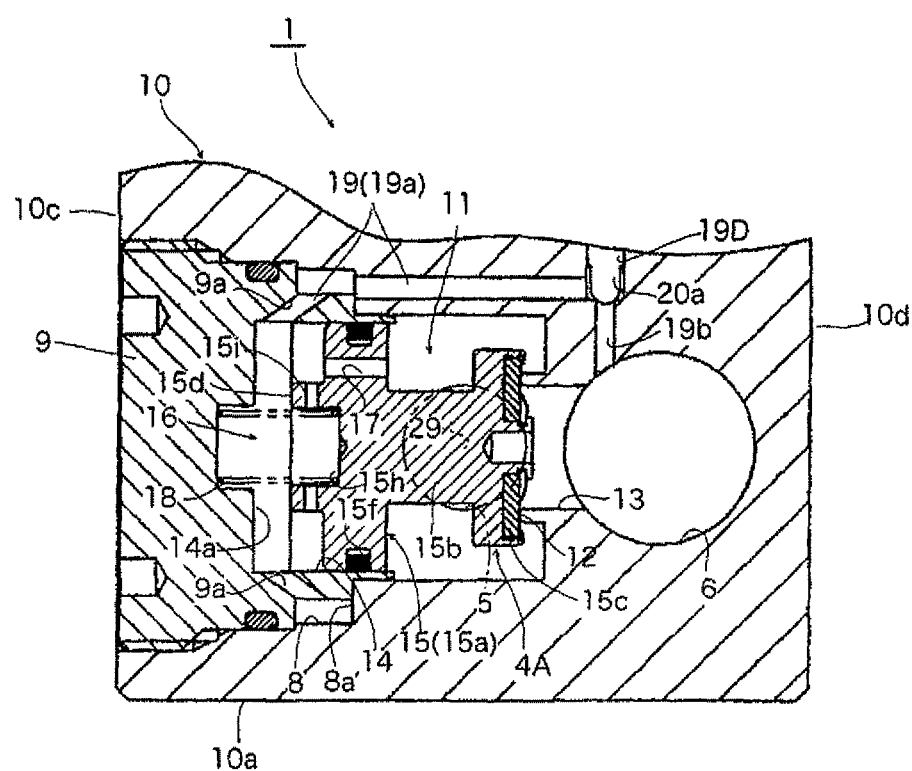
FIG. 6 is a schematic broken view in which a lower portion of a valve main body in FIG. 2 is appropriately cut.
Figure 7A:
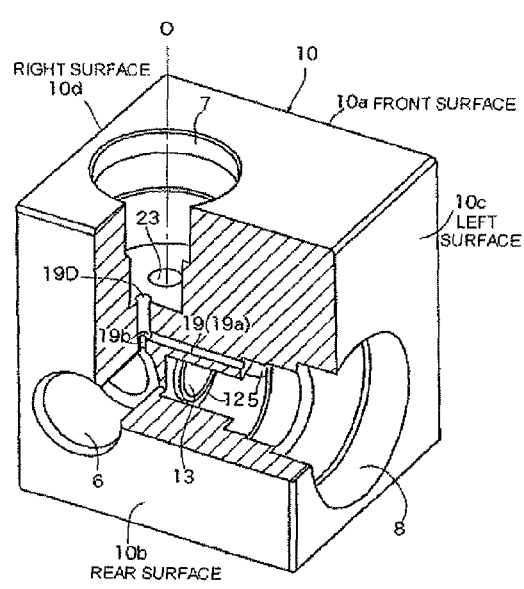
FIG. 7A is a perspective view of a partial cross section of a valve main body 10 in an embodiment of a composite valve according to the present invention as seen from a rear surface 10b side.
Figure 7B:
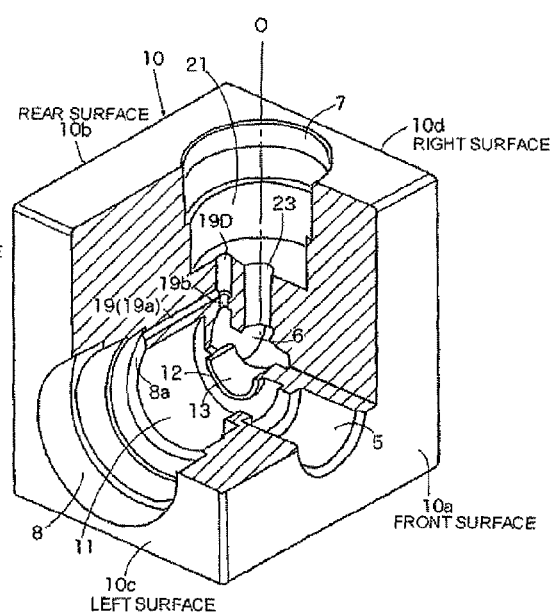
FIG. 7B is a perspective view of a partial cross section of the valve main body 10 in the embodiment of the composite valve according to the present invention as seen from a front surface 10a side.

FIG. 1 is an enlarged cross sectional view of a substantial part and shows an embodiment of a composite valve in accordance with the present invention, and FIG. 2, FIG. 3 and FIG. 4 are cross sectional views as seen from an arrow Z-Z in FIG. 1 in which the respective drawings show different motion states. Further, FIG. 5 is a cross sectional view as seen from an arrow X-X in FIG. 1. FIG. 6 is a schematic broken view in which a lower portion of a valve main body in FIG. 2 is appropriately cut. In other words, it is a drawing obtained by cutting an upper side of the line X-X in FIG. 1 diagonally to a far side from the line X-X in such a manner that a pilot passage 19 (an upstream transverse hole 19a and a downstream vertical short hole 19b) formed in a far side of a cut surface shown on the paper surface of FIG. 1 appears on the paper surface. Further, FIG. 7 is a schematic partly broken perspective view of a valve main body 10 and is provided for describing positions of a hole and a flow path which are provided in the valve main body 10.

Figure 8:
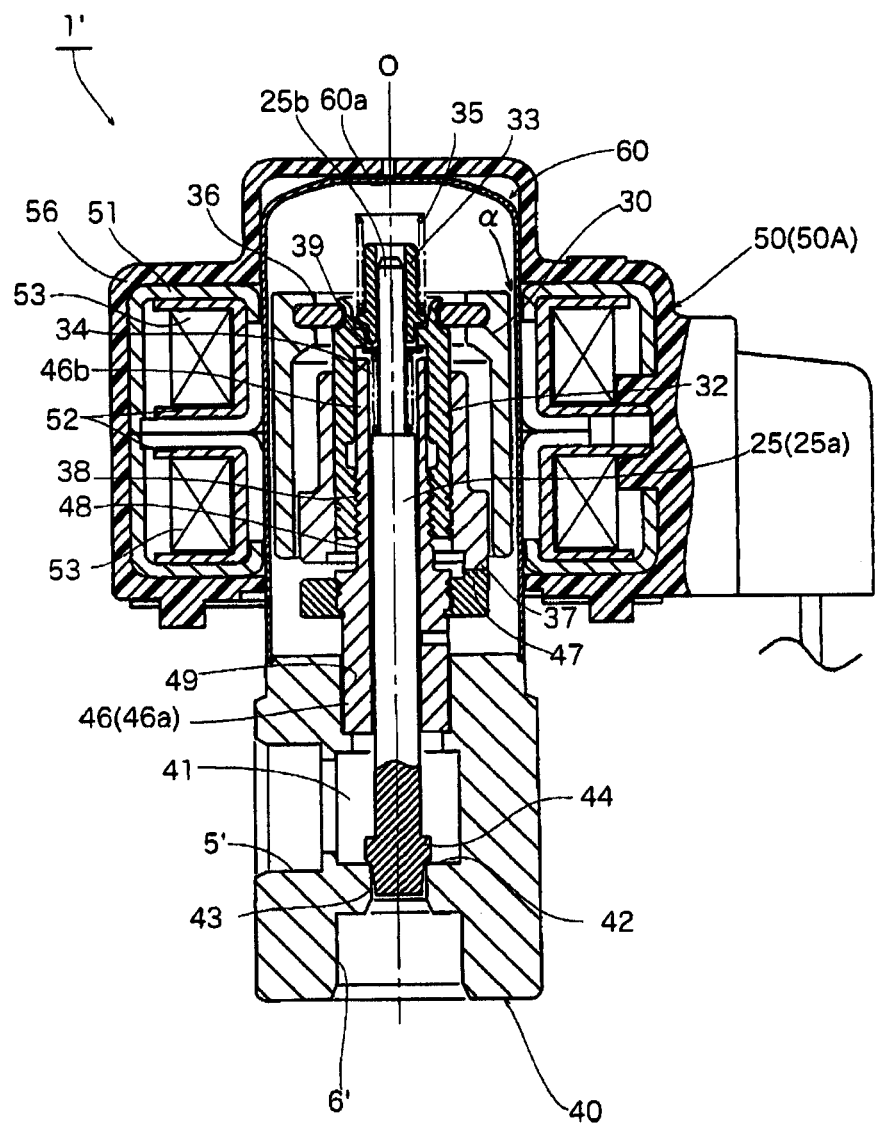
FIG. 8 is a vertical cross sectional view showing an example of a conventional electrically operated valve.

In this case, since a stepping motor (an actuator) 50 portion of a composite valve 1 in accordance with the embodiment is approximately the same as that of the conventional electrically operated valve 1' shown in FIG. 8, the portion is omitted.

The composite valve 1 in accordance with the illustrated first embodiment is provided with a rectangular parallelepiped valve main body 10 which is larger than the valve main body 40 (FIG. 8) of the electrically operated valve 1' in the conventional example, a pilot type first control valve 4A for a larger flow rate (a first valve body 15 and a first valve port 13), a second control valve 4B for a small flow rate (a second valve body 24 and a second valve port 23), and a pilot valve 4C (a pilot valve body 20, a pilot valve body retaining member 27, a pilot passage 19 and a pilot valve body fitting and inserting hole 19D) which controls a driving of the first control valve 4A for the large flow rate, for achieving both an improvement of a flow rate control precision in a small flow rate region and an increase of a controllable flow rate (a reduction of a pressure loss).

First of all, a description will be given of a structure of the valve main body 10. A schematic structure of the valve main body 10 is well shown in FIGS. 7A and 7B. As shown in the drawings, a stepped transverse hole 8 is provided in a lower portion close to a left surface 10c in four side surfaces (a front surface 10a, a rear surface 10b, a left surface 10c and a right surface 10d) of the valve main body 10, an inflow port 5 is provided transversely in the vicinity of a center portion in a lateral direction in a lower portion in the front surface 10a side, an outflow port 6 is provided transversely close to a right side in the lateral direction in a lower portion of the rear surface 10b side, and (center lines of) the transverse hole 8, the inflow port 5 and the outflow port 6 are positioned approximately on the same plane. Further, a stepped concave hole 7 which is open in its upper surface is provided somewhat close to a right side in an upper portion of the valve main body 10.

The stepped concave hole 7 forms a second valve chamber 21 mentioned later, and a second valve port 23 communicates between a lower surface of the second valve chamber 21 and a first valve port 13 which is formed in a far side of the stepped transverse hole 8.

The pilot valve body fitting and inserting hole 19D is formed in a far side of the second valve port 23 as seen from the front surface 10a side of the valve main body 10 and in a lower surface of the second valve chamber 21. Further, the downstream vertical end hole 19b communicates the pilot valve body fitting and inserting hole 19D with the outflow port 6. In other words, the second valve chamber 21 and the outflow port 6 are communicated by the holes which are denoted by reference symbol 19D and reference symbol 19b.

The upstream transverse hole 19a is formed in parallel to the center axis of the stepped transverse hole 8 in such a manner as to communicate a lower portion of the pilot valve body fitting and inserting hole 19D (an end portion of the downstream vertical end hole 19b side), and a terrace portion 8a which is formed in a far side of the stepped transverse hole 8.

In this case, as shown in FIG. 1 and FIG. 6, a lid-like occlusion member 9 is attached by screw to the stepped transverse hole 8 in a state in which the first valve body 15 is inserted to an inner peripheral portion thereof, and the transverse hole 8 is occluded. As a result, a first valve seat 12 side of the first valve body 15 comes to a first valve chamber 11, and the occlusion member 9 side of the first valve body 15 comes to a back pressure chamber 16. In this case, since one or a plurality of through hole 9a is formed in the occlusion member 9 from an inner side thereof toward an outer leading end, the back pressure chamber 16 and the upstream transverse hole 19a are communicated via a space which is formed between the through hole 9a and the occlusion member 9, and the transverse hole 8. As a result, the back pressure chamber 16 communicates with the outflow port 6.

Next, a description will be given of a whole structure of the composite valve 1.

A bush retention body 28 corresponding to an upper portion of the valve main body 40 (FIG. 8) in the conventional electrically operated valve 1' is fixed by screw to an upper half portion of the stepped concave hole 7, a second valve chamber 21 is defined in a lower side than a cylinder portion 28b with ceiling surface which is provided in a lower half portion of the bush retention body 28 in the concave hole 7, and the center of a bottom portion of the concave hole 7 is provided with a second valve seat 22 with a second valve port 23 which a second valve body 24 provided in a lower portion of a lower shaft portion 25a of a valve shaft 25 which is driven so as to move up and down by the motor 50 comes close to and away from and which has a small bore diameter. The second valve port 23 is provided so as to extend in a vertical direction, and is opened in its lower end to an upper surface portion of the outflow port 6.

An upper end of a vertical hole communication path 29 which communicates the first valve chamber 11 and the second valve chamber 21 and is mentioned later is open to the left surface 10c side of the second valve port 23 (approximately the center of the valve main body 10) in the bottom portion of the concave hole 7, and the pilot valve body fitting and inserting hole 19D to which a lower portion of a pilot valve 20 is slidably fitted and inserted is provided in the rear surface 10b side of the second valve port 23 in the bottom portion of the concave hole 7.

The stepped transverse hole 8 is provided with a first valve seat 12 with a first valve port 13 having a large bore diameter, and a left surface opening of the transverse hole 8 is occluded by the lid-like occlusion member 9.

A right side than the lid-like occlusion member 9 in the transverse hole 8 is formed as a fitting and inserting chamber 14 with a ceiling surface (an end surface) 14a to which (a large diameter portion 15a of) a piston type first valve body 15 is slidably fitted and inserted, the back pressure chamber 16 is defined in a left side than (the large diameter portion 15a of) the first valve body 15 in the fitting and inserting chamber 14, and the first valve chamber 11 is defined in a right side than (the large diameter portion 15a of) the first valve body 15.

The first valve body 15 has a bobbin-like outer shape in cross section having the large diameter portion 15a and the small diameter portion 15b, an annular seal member 15c which comes close to and away from the first valve seat 12 so as to open and close the first valve port 13, and is made of a rubber or a Teflon (trade mark) or the like is fixed to one end portion thereof in accordance with an appropriate method such as a caulking or the like, another end surface portion thereof is provided in a protruding manner with a short cylindrical stopper 15d with a transverse hole 15i which comes into contact with the ceiling surface 14a of the fitting and inserting chamber 14 so as to define an upward moving limit of the first valve body 15, and a seal member (a piston ring) 15f is installed to an outer periphery of the large diameter portion 15a.

Further, a first valve closing spring 18 constructed by a compression coil spring is installed in a compression manner between a bottom surface of a spring bearing hole 15h which is provided in the center of a rear end of the first valve body 15 and the ceiling surface 14a of the fitting and inserting chamber 14, in order to energize the first valve body 15 rightward (in a valve closing direction).

Further, a pressure equalizing hole 17 which communicates the first valve chamber 11 with the back pressure chamber 16 is provided in the first valve body 15, for pressure equalizing the first valve chamber 11 and the back pressure chamber 16.

In this case, in the composite valve 1 in accordance with the present embodiment, on the assumption that a pressure of the first valve chamber 11 is set to P1, a pressure of the back pressure chamber 16 is set to P2, a pressure of the first valve port 13 is set to P3, a cross sectional area of the back pressure chamber 16 (a pressure bearing area of the first valve body 15) is set to Ap, a cross sectional area of the first valve port 13 is set to Av, an energizing force of the main valve opening spring 18 is set to Pf, a force pushing up the first valve body 15 is set to a valve opening force, and a force pushing down the first valve body 15 is set to a valve closing force, a valve opening condition of the first control valve for the large flow rate is as follows.

Valve closing force=$P2 \times Ap + Pf$<valve opening force=$P1 \times (Ap - Av) + P3 \times Av$ On the other hand, in the second valve chamber 21, as well shown in FIG. 2, there are arranged a collared round bar pilot valve body 20 which is driven so as to be opened and closed by utilizing an elevating motion of the valve shaft 25 (the second valve body 24) and has a semispherical valve body portion 20a and a collar portion 20b, and a pilot valve body retention member 27 which retains the pilot valve body 20. The pilot valve body retention member 27 is constructed by an upper side portion 27a which is slidably outward inserted to the lower shaft portion 25a of the valve shaft 25, a small diameter cylinder portion 27b which is connected to a lower side of the upper side portion 27a, a large diameter cylinder portion 27c which is connected to a lower side of the small diameter cylinder portion 27b, and a valve body support portion 27d which protrudes outward in a radial direction from the large diameter cylinder portion 27c, and the pilot valve body 20 is fitted and inserted to an insertion hole 27e which is formed in the valve body support portion 27d, whereby the collar portion 20b provided in an upper portion thereof is locked so as to be prevented from coming off.

An intermediate large diameter portion 25f with a retaining shoulder surface (a terrace surface) 25b which is smaller in diameter than the second valve body 24 and larger in diameter than the lower shaft portion 25a is provided just above the second valve body 24 in the valve shaft 25, and the upper side portion 27a of the pilot valve body retention member 27 is put on a shoulder surface (a terrace surface) 25h of the second valve body 24 in an outer periphery of the intermediate large diameter portion 25c via a bearing coil spring 26B in a state of being outward inserted slidably to the lower shaft portion 25a. In this case, the retaining shoulder surface 25g of the intermediate large diameter portion 25f comes to a catch portion for pulling up the pilot valve body 20 via the pilot valve body retention member 27.

As shown in FIG. 2 and FIG. 6, the lower portion of the pilot valve body 20 is slidably fitted and inserted to the pilot valve body fitting and inserting hole 19D. A lower end portion of the pilot valve body fitting and inserting hole 19D constructs a part of the pilot passage 19 (having the through hole 9a, the upstream transverse hole 19a and the downstream vertical short hole 19b) for releasing the pressure in the back pressure chamber 16 to the outflow port 6, and is structured such as to open and close the pilot passage 19 (an upper end opening of the downstream vertical short hole 19b which is open to a bottom surface of the pilot valve body fitting and inserting hole 19D) by the semispherical valve body portion 20a of the pilot valve body 20.

Further, as shown in FIG. 2, between the collar portion 20b of the pilot valve body 20 and the ceiling surface 21a of the second valve chamber 21, there is provided in a compression manner a pilot valve closing spring 26A which energizes the pilot valve body 20 retained by the pilot valve body retention member 27 so as to be prevented from coming off, downward (the valve closing direction) together with the pilot valve body retention member 27A, and has a greater spring load than the bearing coil spring 26B.

Accordingly, when the valve shaft 25 (the second valve body 24) is at the maximum downward moving position (a lift amount is 0) which closes the second valve port 23 as shown in FIG. 1 and FIG. 2, the semispherical valve body portion 20a of the pilot valve body 20 is pressed to the upper end opening of the downstream vertical short hole 19b which is open to the bottom surface of the pilot valve body fitting and inserting hole 19D on the basis of the energizing force of the pilot valve closing spring 26A so as to close the pilot passage 19.

Next, as shown in FIG. 3, if the lift amount of the valve shaft 25 (the second valve body portion 24) goes beyond the predetermined amount Tc, the retaining shoulder surface 25g of the intermediate large diameter portion 25f comes into contact with the lower surface of the upper side portion 27a of the pilot valve body retention member 27, whereby the pilot valve body retention member 27 and the pilot valve body 20 are pulled up against the energizing force of the pilot valve closing spring 26A so as to open the pilot passage 19. In other words, the pilot valve body 20 is structured such as to be driven so as to be opened and closed by utilizing the elevating motion of the valve shaft 25.

In the composite valve 1 structured as mentioned above, since the high pressure refrigerant which is introduced into the first valve chamber 11 from the inflow port 5 is introduced into the back pressure chamber 16 via the pressure equalizing hole 17, and the pressure of the back pressure chamber 16 becomes a high pressure, in the case that the first valve body 15, the second valve body 24 and the pilot valve body 27 are all in the closed state, as shown in FIG. 1 and FIG. 2, the first valve body 15 is strongly pressed to the first valve seat 12.

If the valve shaft 25 (the second valve body 24) is moved up by carrying out a pulse supply to the motor 50 from this state, the second valve port 23 is opened as shown in FIG. 3. In this case, in the case that a lift amount of the second valve body 24 is equal to or less than the predetermined amount Tc, the spring load of the pilot valve closing spring 26A is larger than the spring load of the bearing coil spring 26B. Therefore, the bearing coil spring 26B is compressed on the basis of the rise of the second valve body 24, however, the pilot valve body retention member 27 and the pilot valve body 20 do not move. Accordingly, the pilot passage 19 remains closed by the pilot valve body 27, and the first valve port 13 remains closed by the first valve body 15, thereby coming to a small flow rate control state in which the flow rate of the refrigerant (the opening degree of the second control valve) is controlled in correspondence to a lift amount of the second valve body 24. In this small flow rate control state, the refrigerant at a corresponding amount to the lift amount of the second valve body 24 flows to the inflow port 5→the first valve chamber 11→the vertical hole communication path 29→the second valve chamber 21→the second valve port 23→the outflow port 6.

Further, if the lift amount of the second valve body 24 goes beyond the predetermined amount Tc, the retaining shoulder surface 25g of the intermediate large diameter portion 25f comes into contact with the lower surface of the upper side portion 27a of the pilot valve body retention member 27 and the pilot valve body retention member 27 and the pilot valve body 20 are pulled up against the energizing force of the pilot valve closing spring 26A, as shown in FIG. 4, whereby the pilot passage 19 is opened and the pressure in the back pressure chamber 16 is released to the outflow port 6 via the pilot passage 19. In accordance with this, the pressure of the back pressure chamber 16 falls down, the valve opening force becomes finally larger than the valve closing force which acts on the first valve body 15, and the first valve body 15 moves to a rear side (the back pressure chamber 16 side) so as to open the first valve port 13, thereby coming to the large flow rate control state in which the refrigerant flows to the inflow port 5→the first valve chamber 11→the first valve port 13→the outflow port 6. In this case, FIG. 4 shows the maximum lift state of the second valve body 24 in which the upper side portion 27a of the pilot valve body retention member 27 comes into contact with the ceiling surface 21a of the second valve chamber 21.

As is understood from the description mentioned above, in the composite valve 1 in accordance with the present embodiment, since it is structured such as to be provided with the pilot valve body 20 which is independent from the second valve body 24, in addition to the first control valve 4A (the first valve body 15 and the first valve port 13) for the large flow rate, and the second control valve 4B (the second valve body 24 and the second valve port 23) for the small flow rate, and drive the pilot valve body 20 so as to open and close by utilizing the elevating motion of the valve shaft 25 which is provided with the second valve body 24, it is possible to set the dimension and the shape of the second control valve 4B (the second valve body 24 and the second valve port 23) for the small flow rate to ones which are optimum for the small flow rate control, and it is possible to securely carry out the opening and closing of the first control valve 4A for the large flow rate at the desired timing. Further, since the refrigerant is structured such as to be circulated without being passed through the narrow portion such as the sliding surface gap or the like as is different from the conventional structure at a time of the small flow rate control, it is possible to make the malfunction hard be caused. As a result, it is possible to achieve both of an improvement of the flow rate control precision in the small flow rate region and an increase of the controllable flow rate (a reduction of the pressure loss) without causing an increase of the motion load and an enlargement in size of the driving portion (the motor portion) and the valve main body.

In addition, in the composite valve 1 in accordance with the present embodiment, since the second valve port 23 which is opened and closed by the second valve body 24 is communicated with the outflow port 6, and the composite valve 1 is provided with the vertical hole communication path 29 which communicates the first valve chamber 11 with the second valve chamber 21, and is structured such that the high pressure in the first valve chamber 11 is introduced into the second valve chamber 21, the valve closing force (the pushing down force) acting on the second valve body 24 in the valve closing state becomes significantly larger than the force which is going to push up it. Therefore, it is possible to securely prevent the second valve body 24 from opening the valve undesirably without enlarging the spring load of the valve closing spring (reference numeral 34 in FIG. 8) which energizes the second valve body 24 (the valve shaft 25) in the valve closing direction, and it is possible to reduce the constraint with respect to the bore diameter of the second valve port 23 or the like. As a result, it is possible to achieve a cost reduction, a downsizing and a reduction of an electric power consumption.

Further, in the composite valve 1 in accordance with the present embodiment, since the first valve body 15 is arranged transversely and the second valve body 24 is arranged vertically, in other words, they are arranged in such a manner that the center lines thereof are orthogonal to each other, the inflow port 5, the outflow port 6 and the fitting and inserting chamber 14 are provided transversely, the second valve chamber 21 is provided vertically, and the vertical hole communication path 29 and the second valve port 23 are constructed by the linear vertical hole in which the upper ends thereof are open to the bottom surface of the second valve chamber 21, the refrigerant flow path is shortened in comparison with the case that they are all arranged vertically. Accordingly, it is possible to achieve a downsizing, a further reduction of the pressure loss and an improvement of the pilot chamber depressurizing speed on the basis of the shortening of each of the flow paths which are formed within the valve main body, a reduction of a working cost and the like.

Further, in the composite valve 1 in accordance with the present embodiment, since the pilot valve fitting and inserting hole 20 is formed in the lower surface of the second valve chamber 21 to which the high pressure of the first valve chamber 11 is introduced, and the pilot passage 19 which communicates the back pressure chamber 16 with the outflow port 6 is structured such as to be opened and closed by the pilot valve body 20 which is slidably fitted and inserted to the pilot valve fitting and inserting hole 20 from the second valve chamber 21. Accordingly, the high pressure of the first valve chamber 11 and the second valve chamber 21 is applied to the other portions than the lower surface portion of the pilot valve body 20 (the semispherical valve body portion 20a which occludes the downstream vertical hole 19b). Therefore, it is possible to securely prevent the pilot valve body 20 from opening the valve undesirably without enlarging the spring load of the pilot valve closing spring 26A which energizes the pilot valve body 20 in the valve closing direction, and it is possible to reduce the constraint with respect to the inner diameter of the pilot passage 19 and the bore diameter of the pilot valve seat (the opening portion of the downstream vertical hole 19b which is occluded by the semispherical valve body portion 20a) in the same manner as the case of the second valve body 24 (the valve shaft 25). As a result, it is possible to achieve a cost reduction, a downsizing, a reduction of the electric power consumption and the like.

In this case, it goes without saying that the composite valve in accordance with the present invention is not limited to the structure of the composite valve 1 in accordance with the first embodiment mentioned above, but various modifications can be applied thereto.

For example, in the embodiment mentioned above, the pressure equalizing hole 17 is provided in the first valve body 15, as the means for pressure equalizing the first valve chamber 11 and the back pressure chamber 16, however, the pressure equalizing means is not limited to this, but may be structured such that a small gap is provided between the piston ring 15f which is provided in an outer periphery of the large diameter portion 15a of the first valve body 15, and (the inner wall surface of) the fitting and inserting chamber 14, and the gap is set to the pressure equalizing means.

Further, the description is given on the assumption that the first valve chamber 11 and the second valve chamber 21 are communicated by the vertical hole communication path 29, however, the present invention is not limited to this, but may be structured such that the inflow port 5 and the second valve chamber 21 are communicated.

Further, it goes without saying that the composite valve in accordance with the present invention is not only applied to the heat pump type cooling and heating system, but also may be applied to the other systems.

What is claimed is:
1. A composite valve comprising:
a first valve body;
a valve shaft which is provided with a second valve body;
an elevation driving means for moving up and down said valve shaft;
a pilot valve body which is driven so as to be opened and closed by utilizing an elevating motion of said valve shaft; and
a valve main body which is provided with an inflow port and an outflow port,
wherein between said inflow port and said outflow port in said valve main body, there are provided a fitting and inserting chamber to which said first valve body is slidably fitted and inserted, and which is zoned into a back pressure chamber and a first valve chamber by said first valve body, a first valve port which is open to said first valve chamber, a second valve chamber in which said pilot valve body and the second valve body are arranged so as to be movable up and down, a communication path which communicates said inflow port or the first valve chamber with said second valve chamber, a second valve port which communicates said second valve chamber with said outflow port, and a pilot passage which communicates said back pressure chamber with said outflow port, and
wherein in the case that a lift amount of said second valve body is equal to or less than a predetermined amount, said pilot passage is closed by said pilot valve body, and said first valve port is closed by said first valve body, thereby taking a small flow rate control state in which a flow rate is controlled in correspondence to the lift amount of said second valve body, and in the case that the lift amount of said second valve body goes beyond said predetermined amount, said pilot valve body is moved up in conjunction with the upward movement of said valve shaft so as to open said pilot passage, thereby taking a large flow rate control state in which said first valve body opens said first valve port on the basis of this.

2. A composite valve as claimed in claim 1, wherein said first valve body and the second valve body are arranged in such a manner that their center lines are orthogonal to each other.

3. A composite valve as claimed in claim 1 or 2, wherein said inflow port, the outflow port and the fitting and inserting chamber are provided transversely in said valve main body, and said second valve chamber is provided vertically.

4. A composite valve as claimed in claim 1 or 2, wherein said communication path and the second valve port are constructed as linear vertical holes in which their upper ends are open to a bottom surface of said second valve chamber.

5. A composite valve as claimed in claim 1 or 2, wherein said pilot valve is energized downward by a spring member so as to close said pilot passage, and is pulled up against the energizing force of said spring member by a catch portion which is provided in said valve shaft, if the lift amount of said second valve body is increased further more than said predetermined amount.

6. A composite valve as claimed in claim 1 or 2, wherein said first valve body is provided with a pressure equalizing hole which communicates said first valve chamber with said back pressure chamber.

\* \* \* \* \*

UNITED STATES PATENT AND TRADEMARK OFFICE
CERTIFICATE OF CORRECTION

PATENT NO. : 8,985,548 B2  Page 1 of 1
APPLICATION NO. : 13/711828
DATED : March 24, 2015
INVENTOR(S) : Yusuke Arai et al.

It is certified that error appears in the above-identified patent and that said Letters Patent is hereby corrected as shown below:

On the Title page:

"(72) Inventor: Yusuke Arai, Tokyo (JP)"

should read:

--(72) Inventor: Yusuke Arai, Tokyo (JP);
             Takeshi Kannoo, Tokyo (JP)--

Signed and Sealed this
Twenty-ninth Day of September, 2015

Michelle K. Lee
*Director of the United States Patent and Trademark Office*